United States Patent [19]
Presley

[11] Patent Number: 4,816,164
[45] Date of Patent: Mar. 28, 1989

[54] PAPER CONVERSION PLANT WASTE TREATMENT PROCESS

[75] Inventor: Ronnie D. Presley, Marietta, Ga.

[73] Assignee: Georgia-Pacific Corporation, Atlanta, Ga.

[21] Appl. No.: 101,896

[22] Filed: Sep. 28, 1987

[51] Int. Cl.[4] .............................................. C02F 1/56
[52] U.S. Cl. .................................. 210/710; 210/727; 210/751; 210/917; 210/928
[58] Field of Search .................... 210/710, 727–736, 210/751, 928, 917

[56] References Cited

U.S. PATENT DOCUMENTS

| | | | |
|---|---|---|---|
| 3,868,320 | 2/1975 | Hider et al. | 210/727 |
| 3,909,407 | 9/1975 | Heisey | 210/724 X |
| 3,947,283 | 3/1976 | Uchikawa et al. | 210/753 X |
| 3,947,354 | 3/1976 | Swanson et al. | 210/727 |
| 3,980,558 | 9/1976 | Thompson | 405/128 X |
| 4,012,320 | 3/1977 | Conner et al. | 210/711 |
| 4,113,504 | 9/1978 | Chen et al. | 210/912 X |
| 4,115,188 | 9/1978 | O'Brien et al. | 162/191 X |
| 4,142,912 | 3/1979 | Young | 210/912 X |
| 4,230,568 | 10/1980 | Chappell | 210/751 |
| 4,373,958 | 2/1983 | Jones et al. | 106/118 |
| 4,383,928 | 5/1983 | Sherwood et al. | 210/908 X |
| 4,440,867 | 4/1984 | Sabherwal | 210/660 X |
| 4,479,879 | 10/1984 | Hashimoto | 210/734 X |
| 4,518,508 | 5/1985 | Conner | 210/911 X |
| 4,530,765 | 7/1985 | Sabherwal | 210/912 X |
| 4,554,002 | 11/1985 | Nicholson | 71/12 |
| 4,569,768 | 2/1986 | McKinley | 210/734 X |
| 4,600,514 | 7/1986 | Conner | 210/751 |
| 4,615,809 | 10/1986 | King | 210/908 X |

OTHER PUBLICATIONS

The MAPCO InSTAR Unit brochure.
Betz® Polymer 1158 brochure.
ULTRION TM 7109/55/56/57 Cationic Coagulant Product Bulletin.
Optimer TM Cationic Flocculants Product Line Bulletin.
Nalco 7539 Material Safety Data Sheet.
POZZALIME TM (Mineral By-Products, Inc.) brochure.

Primary Examiner—Tom Wyse
Attorney, Agent, or Firm—Banner, Birch, McKie & Beckett

[57] ABSTRACT

A method for treating the combined ink and starch wastes from a paper converting plant by adding a cationic polymer flocculation adjuvant to the wastewater to form a sludge and then treating the sludge with a cementitious material to yield a stabilized solid safe for disposal by landfill.

10 Claims, 1 Drawing Sheet

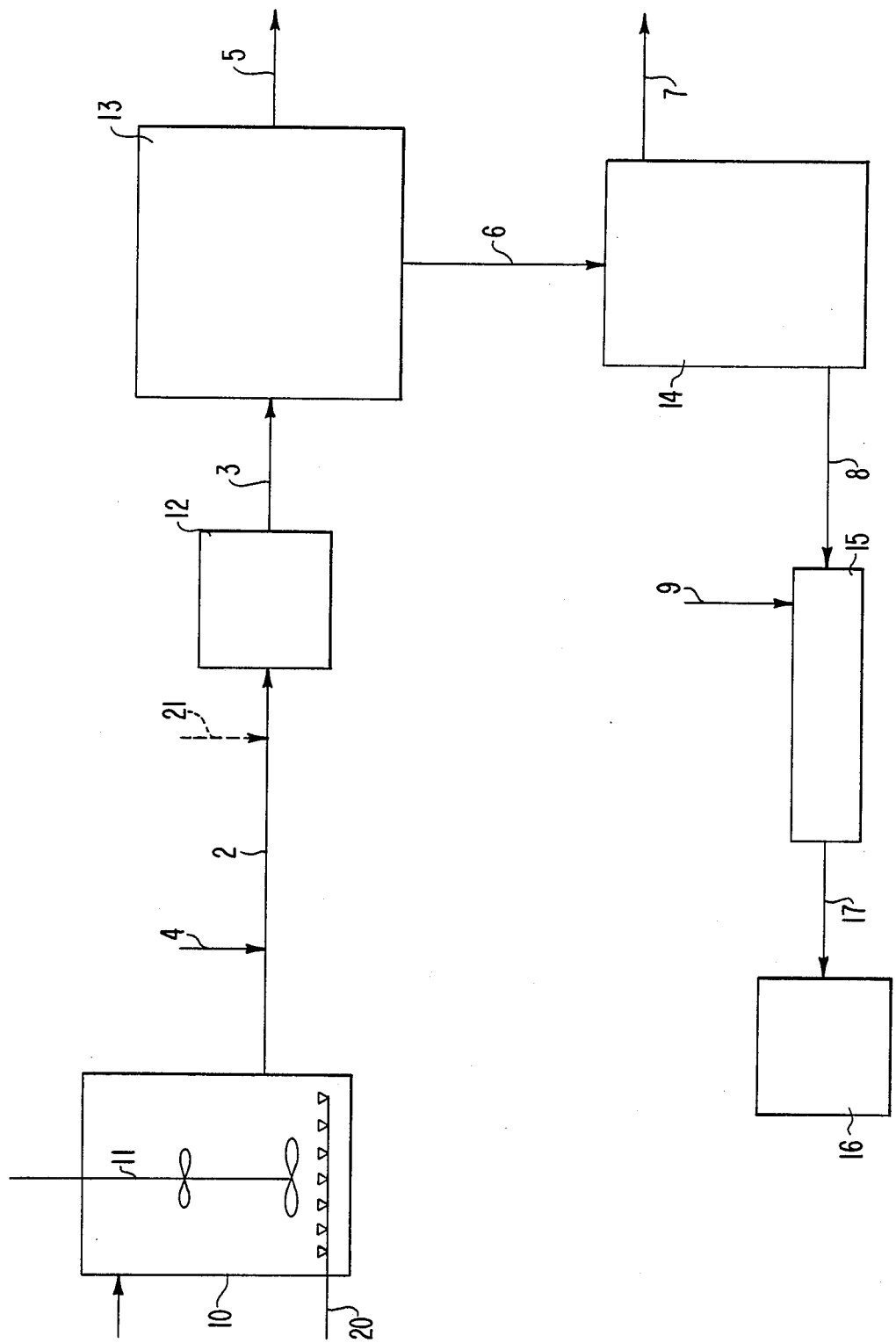

PAPER CONVERSION PLANT WASTE TREATMENT PROCESS

BACKGROUND OF THE INVENTION

1. Field of the Invention

The present invention relates to a method for continuously treating wastewater produced by paper converting operations such as the manufacture of paper bags and paper boxes, including corrugated cardboard containers and the like. The invention specifically relates to a method for separately recovering in a continuous fashion a clarified water stream suitable for discharge into a municipal sewage system and a sludge from the wastewater produced during the operation of a paper converting plant and for treating the sludge to yield a stabilized solid safe for disposal by land fill.

2. Description of Related Art

In the course of converting paper into finished products, such as when manufacturing paper bags and paper boxes including corrugated cardboard containers and the like, a variety of waste streams are generated. Two of the most significant and troublesome from the standpoint of disposal are the wastewater streams produced by the printing and gluing operations.

Generally, paper converting plants use some type of flexographic ink to print onto the paper product. Thus, organic binders and vehicles such as maleic or acrylic resins and glycols and inorganic pigments containing a variety of heavy metals such as lead, chromium, copper, cadmium, arsenic, zinc, nickel, barium and other toxic materials such as cyanide widely used in such inks generally are present in the effluent wash water produced when cleaning the printing equipment. These metals often are toxic to microorganisms in conventional sewage treatment plants. The make-up of the ink waste also undergoes dramatic changes, sometimes frequently, as the nature of the ink used for particular paper products is changed.

While a variety of adhesives may be encountered in paper converting wastewater, by far the most widely used is based on corn starch. Due to its high organic content, starch adhesive waste and the washdown water obtained from cleaning the equipment used to apply the starch-based adhesive, exhibit very high total suspended solids, and biological and chemical oxygen demands (TSS, BOD and COD), and often contain other additives, making them wholly unsuitable for direct disposal into sanitary sewage systems.

In some paper conversion plants, the ink wastes are segregated and treated separately from the starch adhesive wastes. In the past, because of the variable nature of the ink waste these systems have been operated in a batch type manner. For example, the ink waste has been treated with inorganic agents such as ferrous sulfate and lime or sodium hydrochlorite and alum to flocculate and settle the heavy metals. Because the metals in the sludge are mobile, however, the sludge must be handled as a hazardous (toxic) waste. The starch adhesive waste has been enzymatically treated to render the wastewater more amenable to treatment by biological processes, such as activated sludge systems.

For simplicity and economy the waste streams produced in paper converting plants, such as during the manufacturing of paper bags and paper boxes including corrugated containers, are desirably consolidated and treated in one operation. This, however, complicates the treatment and ultimate disposal of the waste material. In particular, due to the presence of the ink waste, the sludge recovered from such combined wastewater stream has proven to be very difficult to dewater.

In U.S. Pat. No. 3,868,320 the treatment of a combined stream of ink waste and starch waste from a paper box manufacturing plant is described using a multivalent metal compounds such as slaked lime, calcium chloride, magnesium oxide, alum, ferrous sulfate or magnesium hydroxide as a flocculation agent, followed by settling, filtering or centrifuging. Because of the variability in the make-up of the wastewater stream, treatment is carried out in a batchwise manner. Only in this way, can the proper balance of the multivalent metal compounds used in this system be determined in order to yield a properly clarified water stream. Attempts at using such materials for continuous treatment proved unsatisfactory. Unfortunately, even batchwise treatment is not a total solution. Due to the hygroscopic nature of the resulting sludge, it is virtually impossible to dewater completely and very difficult to handle. Furthermore, the heavy metals content of the sludge recovered from simple dewatering is readily leachable, thus making the sludge unsuitable for landfill disposal and requiring it to be handled as a hazardous (toxic) waste. Thus, this prior art method simply has substituted one disposal problem for another.

BRIEF DESCRIPTION OF THE DRAWINGS

The sole FIGURE is a schematic flow diagram illustrating a method of continuously treating a wastewater stream produced during the operation of a paper converting plant such as in the manufacture of paper bags or paper boxes, in accordance with the present invention.

DESCRIPTION OF THE INVENTION

The present invention is directed to a method for treating wastewater streams produced during the operation of a paper converting plant such as in the manufacture of paper bags and paper boxes, such as corrugated cardboard containers and the like. The invention is particularly useful for treating a combined wastewater stream from such plants containing inter alia, constituents from the starch-based adhesive and printing ink wash water. The wastewater is treated continuously to yield a clarified water suitable for discharge to municipal sewage systems and a stabilized solid safe for land fill disposal. The method comprises:

(a) adding a catonic polymer flocculation adjuvant to the wastewater stream to produce sufficiently large flocs for clarifying the wastewater stream and separately producing a clarified water stream, having a reduced concentration of pollutants, suitable for discharge into a sanitary sewer and a thickened sludge containing a majority of said pollutants, and (b) blending said sludge with a cementitious material to form a mixture, and aging said mixture to solidify said sludge and bind metals in said sludge in an essentially nonleachable form suitable for land fill disposal.

A preferred embodiment of the invention now will be described with reference to the enclosed FIGURE. A combined wastewater stream from a paper converting plant, for example from a paper box, eg. corrugated container, or paper bag manufacturing operation containing both ink waste and adhesive waste initially is fed to a raw wastewater storage tank 10 through line 1. Tank 10 is equipped with means for agitating its contents such as mixer 11 and with means for aerating its contents such as diffuser 20. Air or oxygen is supplied as needed to diffuser 20 to avoid anaerobic decomposition of the wastewater in tank 10.

Tank 10 is designed to provide sufficient volume for stabilizing, to the extent possible, the flow and composition of the wastewater stream discharged from tank 10 through pipe 2. In this way potential problems on downstream processing operations caused by wide variations in the flow rate and strength of wastewater stream 1 are minimized. Even with this arrangement, however, fluctuations in the strength of the wastewater are substantial.

For a typical paper conversion operation, tank 10 will have a volume on the order of 10,000 to 20,000 gallons. By using appropriate control equipment, a substantially constant out flow of wastewater can be supplied through pipe 2. Preferably, the wastewater flows under its own head, i.e. by gravity, from tank 10 through pipe 2. Applicant has found that to obtain consistent clarification of the wastewater in accordance with the present invention mechanical pumping of the wastewater should be avoided as it tends to introduce minute gas bubbles into the stream.

In accordance with the present invention, the combined wastewater material discharged continuously from tank 10 first is treated with a cationic polymer flocculation adjuvant to produce sufficiently large flocs for clarifying the wastewater stream and to produce separately and continuously a clear (clarified) water stream 5 having a reduced concentration of undesired pollutants, such as heavy metals and organic contaminants, and a sludge 6 containing the majority of said pollutants. The clarified water stream 5 is suitable for discharge directly into a municipal sanitary sewer or may be recycled with or without further treatment to the paper converting plant as process water.

Wastewater in pipe 2, preferably at a substantially constant flow rate, is mixed with the cationic polymer flocculation adjuvant, supplied via line 4. The treated stream then is passed into flocculation tank 12 where the flocs are permitted to grow under very gentle mixing and the wastewater thereafter is fed into clarifier 13 through line 3. Suitable cationic polymer flocculation adjuvants broadly include polymers having amino, ammonium, phosphonium, sulfonium and the like groups. Such cationic polymer flocculation adjuvants are available commercially from a number of sources, as will be recognized by those skilled in the art. Polymeric quaternary amine chlorides are preferred as the cationic polymeric flocculant. A particularly preferred cationic polymeric flocculant is Ultrion ® 7109 marketed by Nalco Chemical Company. Ultrion ® 7109 is an aqueous solution of an aluminum hydroxychloride and a polyquaternary amine chloride. Other cationic polymeric flocculants include Betz ® Polymer 1158 available from Betz Laboratories, Inc. and the Optimers ™ flocculants fron Nalco. For best results, the cationic polymeric flocculant should be used in an amount sufficient to provide between about 300 to 800 ppm (by weight), preferably about 600 ppm, of the cationic polymeric flocculant in the treated wastewater stream.

Applicant has discovered that the changing nature of the wastewater produced during the operation of a paper converting plant may, in many cases, prevent its adequate flocculation and clarification using only a cationic polymeric flocculant. Thus, in order to best maintain adequate treatment under conditions of continuous operation, it has been found that a relatively small amount of an anionic polymeric flocculant should be used in combination with the cationic polymeric flocculant. In this regard, it is important to first add the cationic polymeric flocculant to the wastewater and provide sufficient time for it to initiate flocculation, followed by the addition of an anionic polymeric flocculant to the wastewater to complete floc development and growth. If there is insufficient contact with the cationic polymeric flocculant prior to adding the anionic polymer, then flocs of a sufficient size to adequately clarify the wastewater are not formed.

Suitable anionic polymeric flocculants broadly include polymers containing carboxylate, sulfonate and the like anionic moieties. As will be recognized by those skilled in the art, such anionic polymeric flocculants are available commercially from a number of sources. Anionic polymers based on acrylamide and acrylamide copolymers are particularly useful. A preferred anionic polymeric flocculant for use in combination with Ultrion ® 7109 is Nalco 7539, which is an anionic polyacrylamide available from Nalco Chemical Company. The anionic polymeric flocculant should be used in an amount sufficient to provide between about 2 to 30 ppm (by weight), preferably about 12 ppm, of the anionic polymeric flocculant in the treated wastewater.

Applicant has found that using a combination of cationic and anionic polymeric flocculation adjuvants, as described above, provides a high degree of control over the flocculation process in continuously treating wastewater from a paper converting plant, particularly containing both ink and adhesive wastes. While initial flocculation is caused by the cationic polymer, further growth of the flocs is assisted by the anionic polymer. Thus, the degree of flocculation can be controlled by adjusting the rate or level of the addition of the anionic polymeric flocculant, often in response to a simple visual monitoring of the clarification operation through appropriate viewing ports. Because these material are less effective at high pH, there may be occasions when the wastewater should be neutralized with an acid prior to treatment with the polymeric flocculants. In this regard, muriatic acid has proven to be a suitable reagent.

With reference to the FIGURE, wastewater stream 2 first should be treated with the cationic polymer, added through line 4, followed by the addition of the anionic polymeric flocculant to the wastewater, for example through dotted line 21, not sooner than about 25 seconds thereafter. The treated wastewater then is passed into flocculation tank or flash mixer 12. After about a one minute retention time in flocculation tank or flash mixer 12, under very gentle mixing, the wastewater stream is ready for delivery to clarifier 13 through line 3. Retention of the wastewater in tank 12 is important for growing sufficiently large flocs for effecting adequate clarification. Unless the conditions of the flocculant treatment are suitably controlled, the desired segregation of pollutants into the sludge phase is not satisfactorily accomplished.

Clarifier 13 receives a continuous feed of treated wastewater through line 3 and in turn produces a continuous flow of clarified water in line 5 having a reduced concentration of pollutants and a sludge, which is recovered in line 6, containing a majority of said pollutants.

In order to be suitable for the present invention, the cationic polymeric flocculation adjuvant, preferably in combination with an anionic polymeric flocculant, should produce a treated wastewater stream which can be clarified to yield a clear water stream having a suspended solids concentration of less than about 300–400 ppm preferably less than about 100 ppm and most preferably less than about 50 ppm and having a content of heavy metals low enough to permit the discharge of the clarified stream directly into a municipal sanitary sewer. If this is accomplished, then a sludge is produced which contains the majority of the pollutants. Generally, the sludge recovered from clarifier 13 will amount to about 20% by volume of the initial wastewater.

Sludge from clarifier 13 is passed through line 6 to a sludge decant/storage tank 14. Tank 14 is sized so that a thickened sludge can be supplied periodically via line 8 to the stabilization/solidification portion of the process. Tank 14 is designed to facilitate additional sludge thickening and may be aerated to avoid anaerobic conditions. For a typical paper converting plant, tank 14 will have a volume between about 1,000 to 5,000 gallons. In this way, sludge accumulating in tank 14 need only be removed every second or third day for further treatment in accordance with the present invention. Storage/decant tank 14 is provided with an overflow 7 for substantially continuously discharging additional clarified water from the process. The amount of the overflow water depends in large part upon the settling characteristics of the sludge. Normally, about 90% by volume of the sludge introduced into tank 14 is discharged as clarified water with only 10% recovered as thickened sludge in line 8. Typically, the thickened sludge will have a solids content between about 20–40%.

Sludge from storage tank 14 is passed as needed through line 8 to blender 15 where it is mixed with a cementitious material introduced through line 9. A treated mixture is removed from blender 15 in line 17 and is placed in receptacle 16. After a suitable aging period, the cementitious material solidifies the sludge and binds metals in the sludge chemically and physically in an essentially non-leachable form to form a stable non-polluting solid. The solid then can be disposed using suitable land fill techniques.

Cementitious materials suitable for blending with the thickened sludge recovered from tank 14 contain pozzolanic compounds, e.g. siliceous and aluminous compounds, which in an aqueous environment, and generally in the presence of calcined lime, undergo complex exothermic chemical reactions or aging (curing) to yield a solid, durable rock-like mass. Suitable cementitious materials can be prepared using fly ash recovered from fossil fuel fired power plants (which may contain unconsumed carbon), cement kiln dust, calcined lime, lime kiln dust and similar materials. A particularly preferred material for use in the present invention is Pozzalime ™, available from Mineral By-products, Inc., Marietta, Ga., a subsidiary of JTM Industries, Inc, which contains as its key constituents lime kiln dust made from non-dolomitic limestone and limestone (calcium carbonate).

In order to produce a treated sludge mass which solidifies satisfactorily on aging to yield a stable non-polluting solid, it is important to maintain a proper balance of cementitious material to sludge. Generally, when using Pozzalime ® between about one part by volume of cementitious material per three parts by volume of sludge should be satisfactory. The amount of cementitious material for blending with the sludge may vary somewhat inter alia with the moisture content of the sludge. Usually, a suitable level of addition can be determined by routine experimentation.

After blending the sludge and cementitious material, the mixture typically is discharged from blender 15 into a suitable receptacle 16, such as a paper box container, for aging or curing. Normally, the mixture is allowed to cure for about 8 to 24 hours before it is finally disposed by land fill, so that the exothermic reactions attendant curing are substantially complete. This ensures that the hazardous materials in the sludge, such as the heavy metals, are bound in a non-leachable form and also helps reduce any fire hazard potential due to the heat of the curing reaction.

The invention will be better understood by reference to the following examples, which are offered by way of illustration and not limitation.

EXAMPLES

EXAMPLE 1

In this example the effectiveness of a combination of cationic polymer flocculation adjuvant Ultrion ® 7109 and anionic polymeric flocculant Nalco 7539, for permitting clarification of a wastewater stream produced at a paper box manufacturing plant is illustrated. Table I reports the concentration of various pollutants and other parameters indicative of the strength of the raw wastewater stream of a sample recovered from the raw wastewater storage tank. In Table II, this same information is reported for a clarified water stream sample recovered from the clarifier which was fed raw wastewater after it had been treated with sufficient Ultrion ® 7109 and Nalco 7539 to give concentrations of 600 ppm and 12 ppm in the wastewater respectively and given sufficient time to flocculate.

As evident from comparing the relative magnitude of the reported values in Tables I and II, the quality of the wastewater can be significantly improved by treatment in accordance with the present invention, making it suitable for discharge into a municipal sanitary sewer.

TABLE I

| Parameters | Results |
| --- | --- |
| $BOD_5$ (mg/l) | 1,450 |
| COD (mg/l) | 4,600 |
| Cyanide (mg/l) | 0.11 |
| TKN (mg/l) | 15.1 |
| Oil and Grease (mg/l) | 126 |
| pH (units) | 7.2 |
| Phenols (mg/l) | 0.634 |
| Total Solids (mg/l) | 3,420 |
| Total Suspended Solids (mg/l) | 2,990 |
| Silver (mg/l) | 0.005 |
| Arsenic (mg/l) | 0.0033 |
| Cadmium (mg/l) | 0.005 |
| Total Chromium (mg/l) | 0.014 |
| Hexavalent Chromium (mg/l) | 0.10 |
| Copper (mg/l) | 1.92 |
| Iron (mg/l) | 3.27 |
| Mercury (mg/l) | 0.0005 |
| Nickel (mg/l) | 0.06 |
| Lead (mg/l) | 0.05 |
| Selenium (mg/l) | 0.0017 |
| Zinc (mg/l) | 0.271 |

TABLE II

| Parameters | Results |
| --- | --- |
| $BOD_5$ (mg/l) | 340 |
| COD (mg/l) | 640 |
| Cyanide (mg/l) | 0.1 |
| TKN (mg/l) | 2.8 |

TABLE II-continued

| Parameters | Results |
| --- | --- |
| Oil and Grease (mg/l) | 5.6 |
| pH (units) | 6.5 |
| Phenols (mg/l) | 0.259 |
| Total Solids (mg/l) | 899 |
| Total Suspended Solids (mg/l) | 17 |
| Silver (mg/l) | 0.005 |
| Arsenic (mg/l) | 0.0011 |
| Cadmium (mg/l) | 0.005 |
| Total Chromium (mg/l) | 0.01 |
| Hexavalent Chromium (mg/l) | 0.01 |
| Copper (mg/l) | 0.016 |
| Iron (mg/l) | 0.041 |
| Mercury (mg/l) | 0.0005 |
| Nickel (mg/l) | 0.02 |
| Lead (mg/l) | 0.05 |
| Selenium (mg/l) | 0.0005 |
| Zinc (mg/l) | 0.06 |

EXAMPLE 2

In this example, the thickened sludge recovered from the storage/decant tank of a wastewater treatment system for a paper box manufacturing plant of the type illustrated in the sole FIGURE was treated with Pozzolime TM. One part by volume Pozzalime TM was blended with three parts sludge and then allowed to cure. After curing, the solidified sludge was tested using the methods outlined in *Test Methods for Evaluating Solid Waste* (Physical/Chemical Methods), United States Environmental Protection Agency, SW-846 for total metals content and for leachable metals. The results of the total metal analysis are reported in Table III. In Table IV, the analytical results for the EPA leach test are reported and compared with the concentration standard of each contaminant in the leaching which would qualify the solid as a toxic (hazardous) waste. As seen by comparing Tables III and IV, those metals contaminants in highest concentration in the solidified sludge are held in a substantially non-leachable form in the solidified sludge.

Although certain embodiments of the invention have been described in detail, it will be appreciated that other embodiments are contemplated along with modifications of the disclosed features, as being within the scope of the invention, which is defined in the appended claims.

TABLE III

| Parameters | Results |
| --- | --- |
| Total Cyanide, mg/kg | 1.0 |
| Arsenic, mg/kg dw | 3 |
| Barium, mg/kg dw | 910 |
| Cadmium, mg/kg dw | 0.14 |
| Chromium, mg/kg dw | 12 |
| Lead, mg/kg dw | 4.4 |
| Mercury, mg/kg dw | 0.3 |
| Selenium, mg/kg dw | 1.1 |
| Silver, mg/kg dw | 0.03 |

TABLE IV

| Parameter | Results | Standard |
| --- | --- | --- |
| EP Toxicity | | |
| % that passes 9.5 mm sieve, | 100 | — |
| % Solids @ 105° C., | 67 | — |
| EP Extract Initial pH, | 11 | — |
| EP Extract final pH, | 12 | — |
| ml 0.5N acetic acid/liter extract, | 200 | — |
| Barium (EP Tox), mg/l | 4.5 | 100 |
| Chromium (EP Tox), mg/l | 0.05 | 5.0 |
| Lead (EP Tox), mg/l | 0.2 | 5.0 |

I claim:

1. A method for continuously treating a wastewater stream containing an ink waste from a paper converting plant operation comprising:
   (a) adding a cationic polymer flocculation adjuvant to a continuous flow of the wastewater stream to produce sufficiently large flocs for clarifying the wastewater stream and separately producing in a continuous fashion a clarified water stream having a reduced concentration of pollutants suitable for discharge into a sanitary sewer and a sludge containing a majority of said pollutants, and
   (b) blending said sludge with a cementitious material to form a mixture, and aging said mixture to solidify said sludge and bind metals in said sludge in an essentially nonleachable form suitable for landfill disposal.

2. A method for continuously treating a wastewater stream containing both starch waste and ink waste from a paper converting plant operation comprising:
   (a) adding a cationic polymer flocculation adjuvant to the wastewater stream to produce sufficiently large flocs for clarifying the wastewater stream and separately producing in a continuous fashion a clarified water stream having a reduced concentration of pollutants suitable for discharge into a sanitary sewer and a sludge containing a majority of said pollutants, and
   (b) blending said sludge with a cementitious material to form a mixture and aging said mixture to solidify said sludge and bind metals in said sludge in an essentially nonleachable form suitable for landfill disposal.

3. The method of claim 2 wherein an anionic polymer flocculation adjuvant is added to the wastewater after the catonic polymer.

4. The method of claim 3 wherein said cationic polymer is a polymeric quaternary amine chloride.

5. The method of claim 4 wherein said anionic polymer is an anionic polyacrylamide.

6. The process of claim 5 wherein said sludge is thickened to a solids content above about 20% before blending with said cementitious material.

7. The process of claim 6 wherein said cementitious material contains siliceous and aluminous pozzolanic compounds and calcined lime.

8. The process of claim 7 wherein said cementitious material contains fly ash.

9. The method of claim 8 wherein said cationic polymer is Ultrion ® 7109.

10. The method of claim 9 wherein the cementitious material is Pozzalime.

* * * * *